(No Model.)
P. DIEHL.
REGULATING APPARATUS FOR ELECTRIC MOTORS.
No. 421,911.
2 Sheets—Sheet 2.
Patented Feb. 25, 1890.
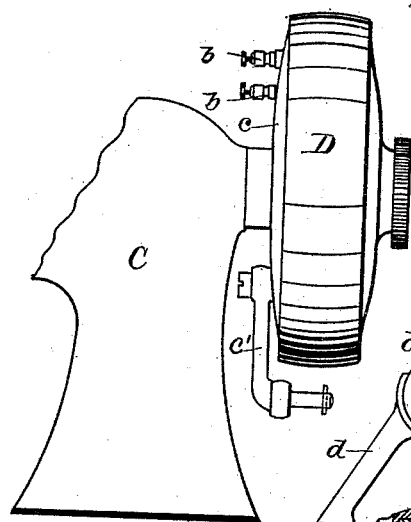
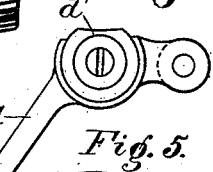
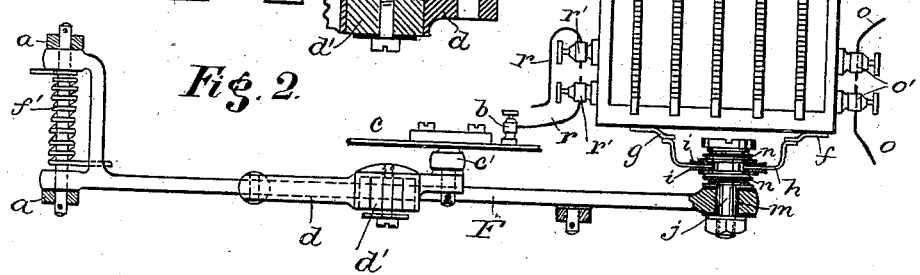
WITNESSES:
INVENTOR
Philip Diehl,
BY
ATTORNEY

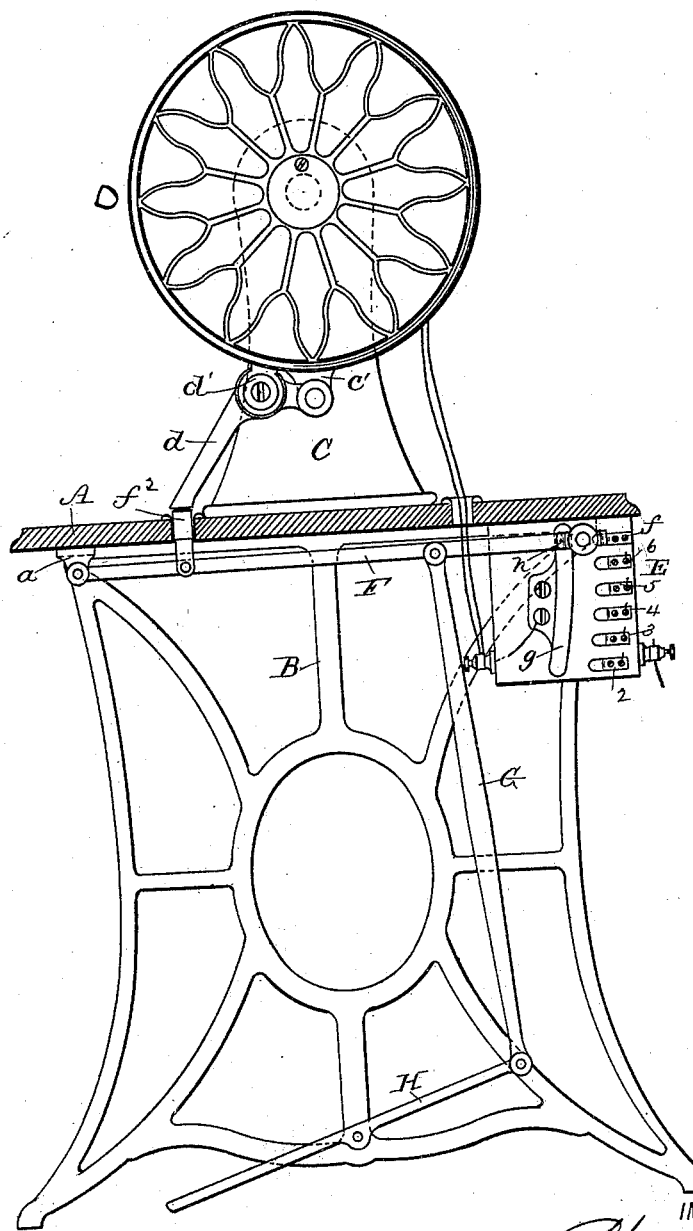

UNITED STATES PATENT OFFICE.

PHILIP DIEHL, OF ELIZABETH, NEW JERSEY.

REGULATING APPARATUS FOR ELECTRIC MOTORS.

SPECIFICATION forming part of Letters Patent No. 421,911, dated February 25, 1890.

Application filed May 6, 1889. Serial No. 309,757. (No model.)

*To all whom it may concern:*

Be it known that I, PHILIP DIEHL, a citizen of the United States, residing at Elizabeth, in the county of Union and State of New Jersey, have invented certain new and useful Improvements in Regulating Apparatus for Electric Motors, of which the following is a specification, reference being had therein to the accompanying drawings.

The object of my invention is to provide a convenient apparatus for regulating the speed of an electric motor, or for entirely arresting the movements of such motor when desired, my invention having reference more particularly to small motors suitable for running sewing and other light machines, but being capable of use with larger motors.

In the accompanying drawings, Figure 1 is an end view of a sewing-machine with my invention applied thereto. Fig. 2 is a plan view of the resistance-box and coils and of the regulating apparatus, the latter being partly in section. Fig. 3 shows a part of a sewing-machine arm with a fly-wheel motor in operative position; and Figs 4 and 5 are detail views of the brake.

A denotes the sewing-machine table; B, the leg thereof; C, the bracket-arm of the sewing-machine, and D a fly-wheel motor, which is or may be substantially the same as shown and described in my patent No. 356,576, dated January 5, 1887.

E is a resistance-box attached to the under side of the table A and containing a series of resistance-coils $e$, each consisting in the present instance of pieces of wood covered with asbestus wound with iron or German-silver wire. To one end of the box E are attached a series of small metallic contact plates or pieces $f$, 2, 3, 4, 5, and 6, and a larger contact-plate $g$, said plate $g$ being connected directly with the motor by a suitable conductor. The box E is provided with suitable binding-posts $o'$ and $r'$, to which are attached conducting-wires, so that said box can be connected in the circuit which drives the motor D.

F is a regulating-lever hinged or pivoted to a bracket $a$, attached to the table A and connected by a pitman G with a "heel-and-toe" treadle H.

The lever F is provided at its free or movable end with an adjustable contact device, by which the circuit passing through the resistance-box may be closed, and which may be adjusted to throw more or less resistance into the circuit or to break it altogether. This adjustable contact device is insulated from the lever F, so that no current will pass through said lever, and is shown in the present instance as consisting of a plate $h$, held between two washers $i$ on a stud $j$, said stud being insulated from the lever by a sleeve $m$ of non-conducting material, and said washers being yieldingly held in place by coil-springs $n$, interposed between them and the lever and head of the stud, respectively. This yielding pressure-connection of the contact-plate $h$ with the lever F insures a reliable and firm contact at all times at both ends of said plate and at all positions of adjustment.

The lever F is provided at its hinged or pivoted end with a spring $f'$, which normally holds said lever lifted to the position shown in Fig. 1. The upper contact-plate $f$ is not connected with any of the resistance-coils or with the plate $g$, so that when the said lever F is in its uppermost or raised position the circuit will be broken. The contact-plate 6 is connected with all of the resistance-coils, and the plates 5, 4, and 3 with a successively decreasing number of said coils, while the contact-plate 2 is not connected with any of the said resistance-coils, but is connected directly with the motor. From this it results that when the contact-plate carried by the lever touches the contact-plate $h$ the motor will be at rest; but when it is lowered to touch either of the plates 6 5 4 3 the circuit will be closed, but with more or less resistance, according to which one of these plates it is in contact with; and when said plate $h$ is lowered to be in contact with the plate 2 the full strength of the current will pass direct to the motor without any resistance.

The conductors $o$ attached to the binding-posts $o'$ on the resistance-box are connected with any suitable source of electricity, and the conductors $r$ attached to the binding-posts $r'$, also on said box, are connected with the motor through the binding-posts $b$ on a plate or cover $c$, supported on the hub of the arm C, said arm being provided with a bracket $c'$, to which is pivoted the brake-lever $d$, having a brake $d'$, which consists preferably of felt, washers of cloth or other soft material which will not scratch or otherwise injure the finished edge of the fly or motor wheel, with which it is to be forced into contact. The regulating-lever F is provided with a projection $f^2$, which extends up through an opening in the table A and engages the lower end of the brake-lever, so that when said lever F is lifted to the position shown in Fig. 1 and the circuit is broken the brake will be forced against the rim of the fly-wheel and the movements of the motor will be arrested.

Instead of using the contact-plate $h$, yieldingly held between the washers $i$, a single contact-plate of suitable size to extend between the large and small contact-plates on the end of the resistance-box may be employed, or the plate $h$ may be used without the washers, if desired.

The particular form of motor herein shown is not essential to the operation of my invention, and it is equally applicable for use in connection with any other well-known form of electric motor.

By insulating the adjustable contact-piece $h$ from the regulating-lever F, by which it is carried, the circuit is prevented from passing through said lever, and all danger of shocks therefrom is thus avoided.

I claim—

1. The combination, with the table A, of the electric motor placed above said table, a brake-lever provided with a brake to engage the motor-wheel, a resistance placed below said table, and a regulating-lever also below said table and provided with a projection extending up through the table and engaging said brake-lever to cause the brake to be forced against the motor-wheel when the circuit is broken.

2. The combination, with the table A, of the arm or machine C, the electric motor sustained thereby above said table, and the brake-lever $d$, pivotally supported by said arm or machine and having a brake to engage the motor-wheel, the resistance below said table, and the regulating-lever pivotally attached to said table and having a projection or part to engage the said brake-lever to operate the brake.

3. The combination, with the resistance and the stationary contact-plates thereof, of the regulating-lever having an adjustable contact plate or device, and springs on both sides of said adjustable contact plate or device, and between which it is yieldingly held so that it may adjust itself to insure perfect contacts.

4. The combination, with the resistance-box and the small stationary contact-plates and the large stationary contact-plate $g$ thereon, of the regulating-lever having an adjustable contact plate or device, and springs between which said adjustable contact plate or device is held.

5. The combination, with the resistance and the stationary contact-plates, of the regulating-lever provided with the insulated stud $j$, the adjustable contact plate or device carried by said stud, and the springs $i$ on said stud on both sides of said adjustable contact plate or device.

6. The combination, with the table A, of the resistance-box E below the same and having a series of stationary contact-plates, a series of resistance-coils within said box, a regulating-lever F below said table and having a contact plate or device which is insulated therefrom, an electric motor above said table, and a brake-lever arranged to engage the motor-wheel and to be operated by said regulating-lever.

7. The combination, with the bracket-arm, the motor or fly wheel, and the resistance, of the plate or cover $c$ on the hub of said bracket-arm and provided with the bracket $c'$, the brake-lever pivoted to the said bracket $c'$, and the regulating-lever having a projection or part to operate said brake-lever.

In testimony whereof I affix my signature in presence of two witnesses.

PHILIP DIEHL.

Witnesses:
JAMES G. GREENE,
L. B. MILLER.